UNITED STATES PATENT OFFICE.

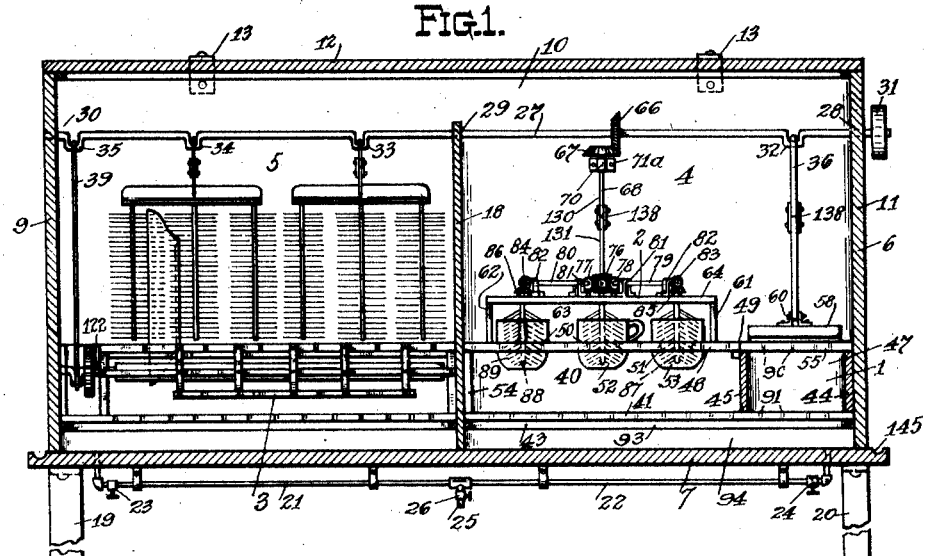

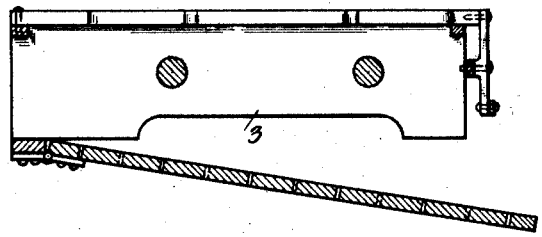
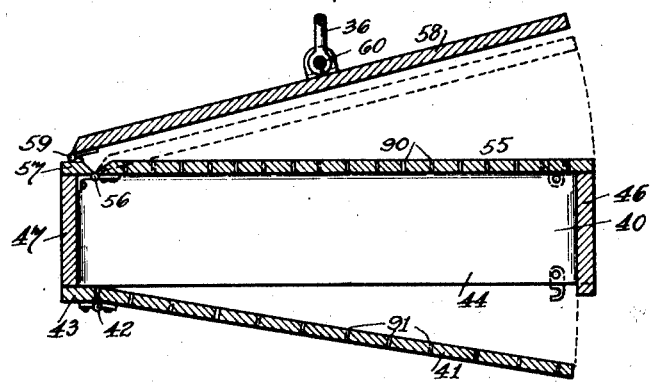

JOHN J. ZOFSAK, OF GREENSBURG, PENNSYLVANIA.

WASHING-MACHINE.

1,388,542.  Specification of Letters Patent.  Patented Aug. 23, 1921.

Original application filed November 18, 1916, Serial No. 132,182. Divided and this application filed November 19, 1917. Serial No. 202,875.

*To all whom it may concern:*

Be it known that I, JOHN J. ZOFSAK, a subject of the Emperor of Austria-Hungary, residing at Greensburg, in the county of Westmoreland and State of Pennsylvania, have invented certain new and useful Improvements in Washing-Machines, of which the following is a specification.

The present invention relates to a machine for washing cups, which is preferably used in conjunction with a machine for washing plates, and similar utensils, and a machine for washing knives, forks and the like, the whole comprising a complete washing machine, as is more fully described in my United States Patent No. 1,353,302, granted September 21, 1920. The said Letters Patent cover what is therein described as the plate washing machine, while the present application is designed to cover the cup washing machine as herein described, and is a division of the above described Letters Patent.

For a clear understanding of the present washing machine, some reference will be made hereinafter in this specification, in a general way to the companion devices above mentioned, which taken together form the complete washing machine.

The means employed to accomplish the object sought, namely the washing of plates, bowls, cups, saucers and knives and forks, consist in a receptacle having therein a number of rotating and reciprocating brushes, and a plunger adapted to create suction together with a means of rotating some of the dishes simultaneously with the operation of the other features of the washing machine.

The whole machine is constructed so that it may be readily cleaned after use, and adapted to be operated by a water motor, or other readily available means of power, and is also provided with its own supports for convenient household or hotel use.

These and other objects and desirable features will be brought out more fully hereinafter in this specification as the description proceeds.

In the accompanying drawings I have shown one complete example of the physical embodiment of my invention constructed according to the best mode I have so far devised for the practical application of the principles of my invention.

Figure 1 is a vertical section of my invention taken on line 1—1 of Fig. 2.

Fig. 2 is a top plan view of the device with the cover of same removed for purposes of illustration.

Fig. 3 is a cross-section taken on line 3—3 of Fig. 2.

Fig. 4 is a cross-section taken on line 4—4 of Fig. 2.

Fig. 5 is a view in cross-section of a removable part of plate washing machine taken on line 5—5 of Fig. 2.

Fig. 6 is a similar cross-section through the knife washing machine taken on line 6—6 of the Fig. 2.

Fig. 7 is an enlarged detail side view of a vertical shaft used, illustrating a special form of construction.

Fig. 8 is a front view of same.

Fig. 9 is a cross-section on line 9—9 of Fig. 7.

Fig. 10 is a cross-section on line 10—10 of Fig. 7.

Fig. 11 is a partial vertical view of a portion of the device taken on line 11—11 of Fig. 2.

For convenience of description I will designate the three mechanisms which together form the complete washing machine as follows. The knife washing machine 1, in which the knives, forks, spoons and similar utensils are washed; the cup washing machine 2; and the plate washing machine 3, in which plates, saucers, bowls, and similar vessels are washed. It will be observed that the knife and cup washing machines are in one compartment 4, while the plates are cleaned in another compartment 5.

The numeral 6 indicates a box or receptacle preferably of wood or similar material having a bottom 7 and side walls 8, 9, 10, 11, and a cover 12 hinged at 13 to the rear wall 10 and adapted to be secured at 14 to the front wall 8. A portion of the front wall 15 is hinged at 16 so that the same may be opened as shown by the dotted position 17. An inner partition wall 18 separates the compartments 4 and 5, and the box 6 is supported by the legs 19, 20, etc. The box is also provided with drain pipes 21, 22 having connection with the compartments 5 and 4 respectively, and control valves 23, 24. Said drainage pipes form a junction and both exhaust into pipe 25, which last is provided with a valve 26.

A main drive shaft 27 is positioned near the top of the box 6, and approximately in the center thereof.

The said drive shaft 27 has bearings at 28, 29, 30, as shown in Fig. 11 of such design as will permit of shaft 27 being entirely removed from the box 6, and a pulley 31 rigidly mounted thereon preferably without the box 6 as shown. The fixed pulley 31 is adapted to receive power from any suitable source of power (not shown). The drive shaft 27 has a number of bent portions 32, 33, 34, 35 which provide points of attachment for a number of connecting rods similar to rod 36 used to operate various parts of the washing devices.

The knife and cup washing compartment 4 has a removable frame 40 consisting of the following parts. A horizontally disposed perforated board 41 hinged at 42 to a longitudinal strip 43, (see Figs. 4, and 6); two vertically disposed partitions 44, 45 rigidly attached to two end pieces 46, 47; a horizontally disposed piece 48 rigidly attached to the vertical partition 45 at 49, and having a series of openings 50, 51, etc. adapted to receive the ordinary cups 52, 53, etc.; and a vertically disposed piece 54 which is rigidly attached to the horizontally disposed piece 48. A perforated part 55 is hinged at 56 to part 57, the latter being rigidly attached to the end piece 47 as shown in Fig. 6. The part 57 also carries the plunger 58 which is hinged at 59 thereto. Plunger 58 has a pivoted connection at 60 with a removable bolt therein adapted to engage the lower end of the connecting rod 36. The frame 40 also is provided with two side pieces 61, 62, and a longitudinal rear piece 63, all rigidly attached to horizontal part 48. A horizontally disposed gear supporting part 64 is hinged at 65 to the longitudinal rear piece 63, and carries a number of shafts with bevel gears thereon, as will be described.

The main drive shaft 27 carries rigidly mounted thereon a bevel gear 66 which meshes with the bevel gear 67 carried on the upper end of the vertical shaft 68. The latter shaft 68 is supported near its upper end by a horizontally disposed support 69 having a bearing 70 therein, and attached at 71ª to the rear wall 10 of the box 6 aforesaid. The bearing 70 is as shown in Figs. 7, 8 and 10. The free end of the support 69 is curved as shown in Fig. 10, and together with the complementary curved part 72 and the hinge 71 forms the bearing 70 in which the vertical shaft 68 revolves. The part 72 is provided with a slot 73 and engages under the revoluble bent pin 74 mounted in the support 69. It is evident that when the pin 74 is in the position shown in Fig. 7 that the vertical shaft 68 is securely held in the bearing 70, and also that the said shaft 68 may be readily removed from the latter when required.

At its lower end shaft 68 is removably seated in a bearing 75 which last is rigidly attached to the gear support 64, and shaft 68 carries a bevel gear 76 which meshes into a series of bevel gears 77, 78, etc., on radially disposed shafts 79, 80, etc. The latter shafts 79, 80, etc. are supported in bearings at 81, 82 on the gear supporting part 64, and carry bevel gears 83, 84, etc., which mesh into the bevel gears 85, 86, etc., on the upper ends of the vertical brush shafts 87, 88, etc. The shafts 87, 88 it will be observed are rotatably mounted in the gear supporting part 64, and are provided with bristles 89 substantially cylindrical in outline and adapted to approximately fit the interior of an ordinary cup. It is evident that when the drive shaft 27 is revolved the motion will be transmitted through the various gears and shafts to the brushes 89, revolving same within the cups supported in the horizontal part 48. It is also apparent that the rotary motion of shaft 27 is changed to reciprocating motion in the connecting rod 36, and that the plunger 58 of the knife washing mechanism is operated up and down as a result, thereby inducing a suction, through the holes 90 of the perforated part 55, and holes 91 of the perforated part 41, when chamber 4 is partially filled with water, as will be explained more fully hereinafter. The frame 40 rests on the longitudinal supports 92, 93 attached to the front and rear walls 8 and 10 of the box 6.

It is also to be noted that when the connecting rod 36 is disconnected at 60, and vertical shaft 68 disconnected at 70 or otherwise from the bevel gears 77, 78, etc., that the frame 40 and accompanying parts can then be entirely removed from the box 6. And it is further observed that the cleansing of the frame 40 can be readily accomplished due to the hinged connection of parts used at 42, 56, 59, etc. The purpose of the perforations in the horizontally disposed parts 48 and 41 is to permit any of the heavier solids that may be washed from the cups, knives, forks, etc., to pass down through the perforations to the bottom portion 94 of the chamber 4.

In connection with the vertical connecting rod 36 and vertical shaft 68, a specially constructed joint is used, as shown in large detail in the Figs. 7 to 10 of the drawings, which shows the vertical shaft 68 of the cup washing mechanism. The shaft 68 is formed of two separate parts 130, 131. The upper portion 130 as before explained being supported by horizontal support 69 in the bearing 70, and the lower portion 131 being attached slidably and pivotally to the upper portion 130 by means of two side splice plates 132, 133 and pins 134, 135, which pass through said plates and the parts 130 and 131. A plate 136 is rigidly attached to the upper part 130 and projects over the upper end of the lower part 131 at 137, but is not attached to the latter, forming a rear support for the joint 138.

On its face the upper part 130 has a slidable plate 139 pivotally connected at 140 to the same, and having a slot 141 therein adapted to slidably engage under a headed pin 142 fixed in the part 131. It is seen that when the pivoted plate 139 is parallel with the shaft 68 and in engaged position beneath the headed pin 142 that a rigid joint is made at 138, and also that when the plate 139 is reversed the part 131 can then take a number of positions such as shown dotted at 143, in which case bevel gear 76 is disengaged from bevel gears 77, 78 etc. or part 131 can be made to assume the position indicated at 144. The utility of this feature of the shaft 68 is at once apparent in connection with the removal of the frame 40 and accompanying parts from the box 6. It is readily understood that the same feature is applied to the connecting rod 36 for the same purpose. It will also be understood that when the shaft 27 is removed entirely from its bearings, by disengaging the connecting rod 36 from the plunger 58 at 60, and connecting rod 39 from shaft 122, the frame 40 can be lifted bodily from the washing machine chamber 4, in which case the vertical shaft is removed from the bearing 70; and that in this event the specially constructed joint 138 is unnecessary. It may be said however that the shaft 27 is ordinarily removed for cleaning purposes only, whereas the joint 138 permits the cups, knives, forks, etc., to be inserted in the washing machine, and the portion 15 of the front wall 8 of the box is hinged at 16 to permit of greater freedom of movement in this connection.

Operation of the device is as follows. The cover 12 is thrown backward, connecting rod 36 and shaft 68 are disconnected at their lower extremities, broken at the joints 138 in each, and then placed in an inverted position similar to that indicated at 144 in Fig. 7, as nearly as the circumstances will permit. The portion 15 of the front wall 8 of the box is thrown open, the parts 64, 58, 55 are raised upward and the knives, forks and spoons, are placed in the knife washing mechanism 1, and the cups in the openings in the horizontal part 48. The shaft 68 is now replaced in position in the bearing 75, and the connecting rod 36 reconnected to the plunger 58 at point 60, and the device is ready to be partly filled with soap suds and hot water. It is to be noted in this connection that the water level maintained in the chamber 4 is preferably lower than in chamber 5, and the division wall 18 is designed to meet this condition. The portion 15 of the front wall 8 of the box is now closed, the cover 12 replaced and locked at 14 and power from a water motor (not shown) or other source is applied to pulley 31, and shaft 27 thereby operates the brushes 87 within the cups, and plunger 58 reciprocates and by suction washes the knives, forks and spoons within the chamber of the knife washing mechanism 1.

When thoroughly washed the dishes can be removed as readily as they were inserted in the device, the chamber 4 drained by pipe 22, and the washing machine is ready for a repetition of the operation when necessary.

The washing machine can be brought into close relation with the ordinary sink, a water motor attached to the faucet, and connected by belt to pulley 31 thereby furnishing the power to operate the device. After use the washing machine can be removed bodily to any convenient place, and the same is furnished with supporting legs 19, 20, etc., for this purpose. Any water that may spill over the top edges of the box 6 is caught by the gutters 145 formed in the bottom 7 of same. From the above description it is seen that I have provided a device of utility for the purpose intended and above set forth.

What I claim is:—

1. In a washing machine, an inclosing receptacle, means for holding a number of cups in an upright position, a plurality of rotatably mounted brushes adapted to operate within the said cups, a horizontal drive shaft mounted in said receptacle, means for transmitting motion from the drive shaft to the rotary brushes, and means whereby part of the said transmitting means may be disconnected and placed in an inverted position.

2. In a washing machine, an inclosing receptacle, means for holding a number of cups in upright positions, a plurality of brushes adapted to revolve within said cups, a horizontal drive shaft having a bevel gear thereon, and rotatably mounted in the inclosing receptacle, a vertically disposed shaft provided with a hinge intermediate of its length, for placing the lower end of said shaft in an inverted position, having a bevel gear on its upper end, intermeshing with the first mentioned bevel gear, and means for transmitting motion from the vertical shaft to the said revoluble brushes.

3. In a washing machine, an inclosing receptacle, a removable frame comprising a perforated cup holding member, and a hinged brush supporting member surmounted on the same, a number of vertical rotary brushes mounted in the said brush supporting member, adapted to revolve within the cups; and means for operating the said vertical brushes.

4. In a washing machine, an inclosing receptacle, a removable frame supporting a number of cups, and having a shaft bearing thereon, a plurality of vertical rotary brushes with bevel gears carried by the removable frame; a horizontal drive shaft; a shaft support having a bearing with locking means, attached to the receptacle wall; a vertical shaft carried by the shaft support and engaging the shaft bearing on the removable frame, power transmitting means on the vertical shaft engaging complementary means on the drive shaft, a bevel gear mounted on the lower end of the vertical shaft, a number of radially positioned gear shafts on the removable frame with means for engaging the bevel gears on the rotary brushes, and the gear at the base of the vertical shaft aforesaid.

5. In a washing machine, an inclosing receptacle, a removable frame comprising a perforated cup holding member having a number of cut-out portions each adapted to receive a cup, a hinged brush supporting member surmounted on the cup holding member and carrying a series of vertical rotary brushes in centrally alined positions with relation to the cut-out portions of the said cup holding member and means to rotate said brushes.

6. In a washing machine, an inclosing receptacle a removable frame comprising a perforated cup holding member having a number of cut-out portions each adapted to receive a cup, a hinged brush supporting member surmounted on the cup holding member, a number of vertical rotary brushes in the brush supporting member, a number of radially arranged horizontal gear shafts on the brush supporting member having bevel gears on their inner ends, and operative connections with the aforesaid vertical brushes and means for rotating the horizontal shafts.

7. In a washing machine, an inclosing receptacle a removable frame having a horizontally disposed cup-holding member with openings therein each adapted to receive a cup; an upwardly swinging brush support designed to permit the insertion and removal of cups in the cup-holding member, and attached to the removable frame; a number of vertical brushes, each having a bevel gear on its upper end and rotatably mounted in the brush support, and means engaging the said bevel gears for simultaneously operating said brushes from a single point of actuation.

In testimony whereof I affix my signature in the presence of two witnesses.

JOHN J. ZOFSAK

Witnesses:
DAVID STONECIPHER,
WILLIAM A. HIRTLE.